United States Patent [19]
Nally

[11] Patent Number: 5,235,652
[45] Date of Patent: Aug. 10, 1993

[54] QUALIFICATION SYSTEM FOR PRINTED IMAGES

[76] Inventor: Robert B. Nally, 189 Mary Street, Waterloo, Ontario, Canada, N2J 1S1

[21] Appl. No.: 790,593

[22] Filed: Nov. 8, 1991

Related U.S. Application Data

[63] Continuation-in-part of Ser. No. 307,931, Feb. 9, 1989, abandoned.

[30] Foreign Application Priority Data

Feb. 9, 1988 [GB] United Kingdom ............... 8802940

[51] Int. Cl.[5] ............................................. G06K 9/03
[52] U.S. Cl. ........................................ 382/57; 382/34; 382/64
[58] Field of Search ............... 235/449, 379; 358/400; 382/7, 34, 58, 57, 64, 65, 67

[56] References Cited

U.S. PATENT DOCUMENTS

| | | | |
|---|---|---|---|
| 3,863,219 | 1/1975 | Rohrer | 382/64 |
| 3,949,363 | 4/1976 | Holm | 382/64 |
| 4,205,780 | 6/1980 | Burns | 235/449 |
| 4,490,850 | 12/1984 | Nally et al. | 382/34 |
| 4,523,330 | 6/1985 | Cain | 382/7 |
| 4,555,617 | 11/1985 | Brooks et al. | 235/379 |
| 4,685,141 | 8/1987 | Hoque et al. | 382/25 |

Primary Examiner—Jose L. Couso
Attorney, Agent, or Firm—Daryl W. Schnurr

[57] ABSTRACT

A system for automatically determining the quality of various types of printed images uses either a single element optical sensor or a multi-element sensor which may include one or more of an optical, magnetic, thermal or acoustic transducer. A microprocessor is used to store a standard set of images in its memory and measures certain image characteristics of the printed images by automatically comparing the printed images on a background material with the standard images. The microprocessor then causes the system to produce a result of said comparison and to make a decision as to whether each of the printed images satisfy a set of measurements for the standard images. The system has various uses but is particularly useful in the banking business to determine whether newly printed cheques meet the required print standards before releasing the cheques for the use of customers.

23 Claims, 5 Drawing Sheets

12
QUALIFICATION SYSTEM FOR PRINTED IMAGES

This is a continuation-in-part application of application Ser. No. 07/307,931 filed Feb. 9, 1989, now abandoned.

BACKGROUND OF THE INVENTION

1. Field of the Invention

This invention relates to a system for automatically determining the quality of various types of printed images. In particular, the system electronically compares printed images to a set of standard images stored in an electronic memory.

2. Description of the Prior Art

Machines are presently available that will analyze printed images on a background material for the purpose of determining how closely the input printed image conforms to a specified printed image stored in an electronic memory. However, previous machines are not satisfactory in that they are not sufficiently accurate or they are not fully automatic or they require constant operator supervision or they are not sufficiently versatile or they require manual input or they do not make measurements of the printed images to compare them to standard images or they are not suitable for determining the accuracy of printed documents prior to use.

SUMMARY OF THE INVENTION

It is an object of the present invention to provide a system for automatically determining the quality of printed images where the system utilizes either a single element optical sensor or a multi-element magnetic and/or optical sensor or a combination thereof.

A system for automatically determining the quality of printed images on a background material by measuring specific characteristics of said images by comparing them to a set of measurements for standard images stored in an electronic memory has recognition means, transducing means and measuring means. The recognition means first identifies a particular character of each of the printed images to be measured. The transducing means has at least one multi-element sensor that is selected from the group of magnetical or optical, said multi-element sensor being arranged to scan the same printed images for which the character has been identified by said recognition means. The multi-element sensor produces a series of analog signals in the form of two-dimensional electronic images, there being one electronic image for each of said printed images. The multi-element sensor is connected to amplifiers and filters and to an analog-digital converter to convert said analog signals to digital signals. The measuring means electronically measures certain image characteristics for said electronic images by comparing the measurements taken to a set of measurements for standard images. There are means for producing results of said comparison and means for making a decision as to whether each of the printed images satisfy the set of measurements for standard images.

In a variation of the present invention, the system has at least one sensor having an optical element said sensor producing a series of analog signals in the form of a two-dimensional electronic image for said printed images.

BRIEF DESCRIPTION OF THE DRAWINGS

In drawings which illustrate a preferred embodiment of the invention.

DESCRIPTION OF A PREFERRED EMBODIMENT

Figure 1A:
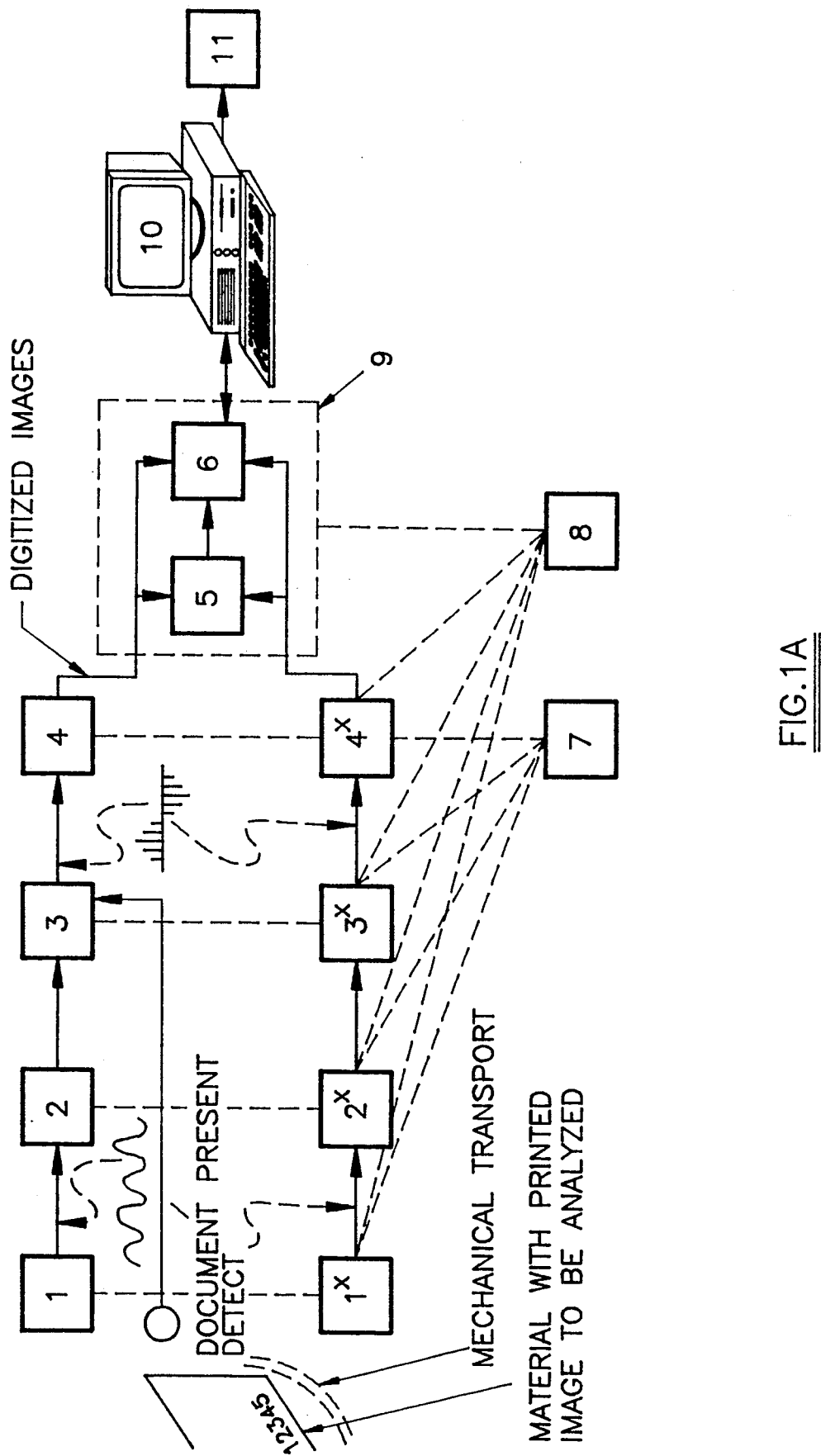
FIG. 1A is a block diagram of one embodiment of the invention having two transducers.
Figure 1B:
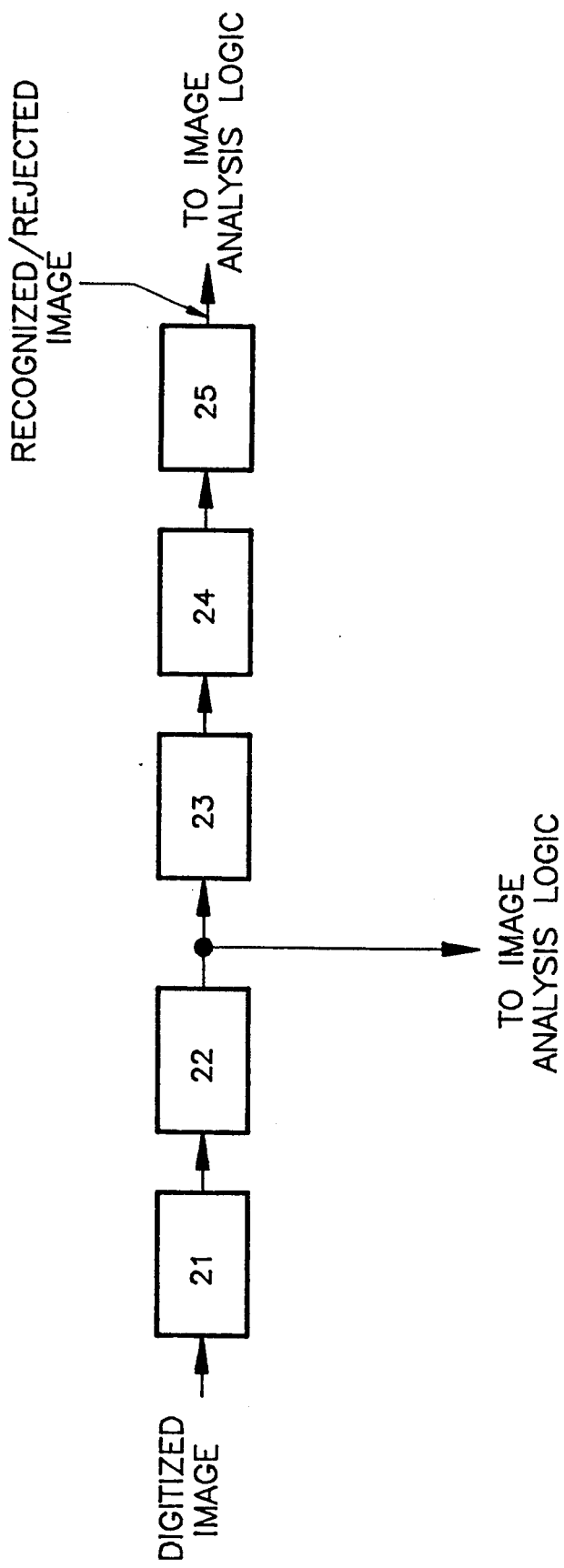
FIG. 1B is a block diagram showing a breakdown of a printed image recognition logic portion of the block diagram of FIG. 1A.
Figure 1C:
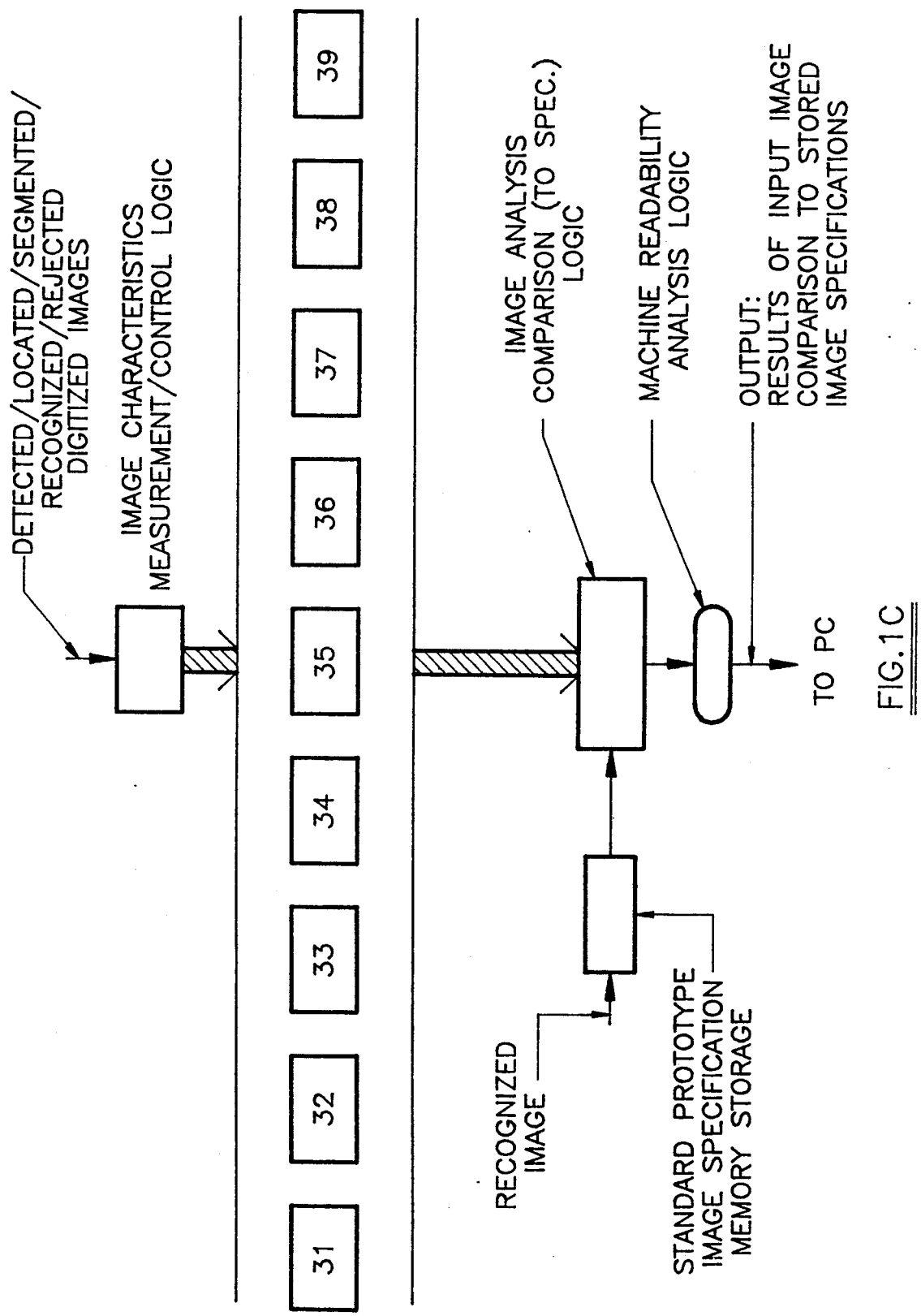
FIG. 1C is a block diagram showing a breakdown of a printed image analysis logic portion of FIG. 1A.

Referring to the drawings in greater detail, in FIGS. 1A, 1B and 1C, there is shown a block diagram of a preferred embodiment of the qualification system of the present invention. It can be seen that the system has one or more transducers $1$, $1^x$. The transducers can be of various types, for example, magnetic, optical, acoustic or another type. The transducers are sensors. The sensors are multi-element sensors in one embodiment of the invention with one of the elements, in all cases, being either magnetic or optical. In another embodiment of the invention, the sensor can be single element or multi-element as long as the sensor always has at least one optical element. The transducers can be single element transducers, or a two-dimensional array of multiple element transducers.

From FIG. 1A, it can be seen that the transducers $1$, $1^x$ are connected to amplifiers in filters $2$, $2^x$ respectively. The transducers produce a plurality of analog signals for the printed images to be analyzed and these signals are amplified and filtered to minimize distortion and to remove interference from the detected signal representing the printed images. The transducers $1$, $1^x$ are connected to analog-digital converters $3$, $3^x$ respectively. The converters convert the analog signals from the transducers to digital signals having a number of grey levels. The digital signals are then fed into computer interfaces $4$, $4^x$ from the converters $3$, $3^x$ respectively. The digital signals are temporarily stored in an electronic digital buffer memory before being input into a special purpose firmwear logic controller and/or computer $9$, $10$. The controller and/or computer $9$, $10$ perform the automatic printed image recognition function $5$ and the printed image quality analysis, measurement and readability function $6$. A set of standard images is stored in an electronic memory of the computer $10$, the standards being laid down by an appropriate standards body, for example, ANSI (a trade mark), ABA (a trade mark), ECMA (a trade mark), CBA (a trade mark) or BSI (a trade mark). Print quality standards are also included in the electronic memory of the computer $10$. For example, OCR (a trade mark), MICR (a trade mark) and BAR CODES (a trade mark).

The printed image recognition logic and the printed image analysis logic in the controller $9$ together with the computer $10$ electronically compare the electronic images with appropriate images of the set of standard images and produce a result of said comparison. The result is communicated graphically to an operator of the system through a peripheral $11$, for example, a printer or display, to allow the operator to interact with and query the results of the printed image quality analysis.

The system shown in FIG. 1A has an optional diagnostic logic system 7 connected thereto. The purpose of the diagnostic logic 7 is to allow an operator to determine the cause of a system fault and to correct this fault. The fault would include any major out of tolerance conditions detected during a system calibration process.

As a further option, the system also contains a calibration logic subsystem 8 which allows an operator to routinely check to ensure that the system itself is properly calibrated. The calibration of the system will be checked by using a proprietary set of very accurate, high quality, printed images on an appropriate background carrier for example, paper, for the particular type of useage for the system. The calibration images on the proprietary set may be printed in the magnetic and/or other types of inks depending on the desired use of the system and will consist of various shapes such as bars, squares, lines of various orientations and curvatures and of varying widths, lengths, angles and spacing. When in the calibration mode, the system will analyze the input image of the calibration documents with respect to the ideal prototype requirements stored in memory and use this information to modify the key image quality analysis parameters stored in the printed image recognition logic 5 and the printed image analysis logic 6.

For example, if image motion is used, the calibration documents will allow the machine to determine whether or not the transport speed is within specifications and the machine will incorporate a correction factor into the analysis if the speed is not within specifications. As another example, if the expected amplification factor is not within the specification based on the reference levels of the calibration documents, a correction factor will be stored in the machine to eliminate this variation from the actual image quality analysis. The calibration logic 8 could also be used to eliminate consistent noise. In this situation, a blank document could be passed in front of the transducer or transducers and the noise level measured and stored. The signal could then be subtracted from the input image signal to minimize the consistent background noise component.

In FIG. 1B, a block diagram is shown setting out a further breakdown of the Printed Image Recognition Logic (henceforth PIRL) 5 of FIG. 1A. The embodiment of FIG. 1B is based on the multi-element sensor of FIG. 1A being a single slot magnetic transducer and linear optical array sensor.

In the embodiment shown in FIG. 1B, the PIRL operates on a digitized magnetic image stored in a digital buffer memory. The image data is pre-processed in an image filtering and thresholding processor 21 to remove electrical noise and unwanted frequency components. The optical image is also processed here to enhance and sharpen the image and remove background information.

Next, the image data is scanned in a segmentation module 22 to detect and locate character data within the continuous stream of digitized data. The appearance of a positive going peak may signal the starting location for individual character data. The process begins by scanning the digitized data until a sample S1 is located whose value is above a primary threshold T1. Several checks are then performed to test for the presence of valid character data, namely: 1) contiguous data values must remain above the primary threshold level T1 for a minimum number of sample N1; 2) contiguous data values must remain above a secondary threshold level T2 for a minimum number of samples N2, where $T2>T1$ and $N2<N1$; 3) the sum of the data values for all samples whose values were continuously greater than T1 must be greater than a minimum energy threshold E1; and 4) a negative going peak of value less than T3 must be found within N3 samples of the location of S1. When a set of samples is found which satisfies the above criteria, a character is said to be located at S1. The actual values selected for T1, T2, T3, N1, N2, N3 and E1 are dependent upon the choice of sampling density and the resolution of the A/D converters 4, $4^x$.

When a character has been located at S1, key feature extraction 23 is performed. A fixed number N4 of data samples immediately following S1 is scanned to determine the locations and values of major peaks or features. The value of N4 is dependent upon the font being analyzed. The peak values of the features are combined to produce a normalization factor which is applied to the data for subsequent processing. Its purpose is to remove the effects of magnetic signal strength from the data so that data for all characters is roughly the same amplitude.

The key feature data, after application of the normalization factor, is next compared to a set of standard images P(i) in module 24 stored in electronic memory. There is one such predefined pattern for each character in the font being analyzed. As the key feature data for the character data being analyzed is compared to a standard image, a "Quality of Match" figure, Q(i) is generated for each pattern. The set of all Q(i) is forwarded to the next and final module 25 where the final classification decision is made.

The image classification decision logic 25 is presented with the set of Q(i) to make the final recognition decision. The algorithm is a simple minimum distance classifier, well described in the literature. For the present embodiment, the Q(i) represent "distances" of the data from the pattern. The lowest value of Q(i) is compared to a threshold T4. If the value of Q(i) is less than T4, the data is deemed to be correspond to the standard image P(i) and the character is recognized. If the value of Q(i) is greater than T4, the data is deemed unrecognizable.

The entire procedure 22 through 25 is repeated working through all data in the image buffer until the end of data is encountered. At this point, all characters will have been located and an attempt will have been made to recognize them. If one or more characters were deemed unreadable, operator intervention may be required as a backup to manually identify the unknown characters.

It should be noted that the PIRL function is not an essential feature of the present invention. The purpose of the PIRL function is to enhance the operation of the image quality determination system by eliminating the need, in most instances, for the operator to manually input the printed image information to be analyzed. The identification of a particular character is made for each image to be analyzed before any analysis is undertaken. That character identification can be made manually or automatically.

When all characters have been identified or recognized, whether automatically or through operator intervention, the image data from all sensors are passed to the Printed Image Analysis Logic (henceforth PIAL) shown in FIG. 1C. Considering the present embodiment, the digital buffer memory containing the digitized image data acquired from each sensor 4, 4$^x$ is connected to a series of modules 31 through 39 for print characteristics measurement by control logic. The data for each sensor may or may not be operated on by a particular module, depending on the nature of the print characteristic being measured. For example, for characters printed with magnetic ink, image data derived from an optical sensor would not be passed to a module intended to examine the magnetic signal strength. Similarly, image data derived from a magnetic sensor would not be passed to a module intended to measure the optical print contrast ratio.

The print characteristic measurement modules 31 to 39 inclusive each examine a specific characteristic of the print. The characteristics that are examined are a function of the sensor(s) and the print font specification in use and may include but are not limited to the following:

31—Image location and spacing measurement: determining the exact placement of characters with respect to the edges of the document and with respect to each other, both horizontally and vertically;

32—Image print contrast/intensity measurement: determine the absolute levels, the variation from one character to the next and the variation within a character;

33—Image skew angle measurement: determine the angle of the baseline of individual characters with respect to the baseline of the document;

34—Image stroke width measurement: determine the widths of horizontal and vertical strokes in each character;

35—Image edge variation measurement: examine the edge regularity of horizontal and vertical strokes in each character;

36—Image void measurement: examine all strokes of a character for voiding (absence of ink);

37—Image size and dimension measurement: determine the overall width and height of each character;

38—Image extraneous ink measurement: examine the spaces around all strokes of each character for evidence of unwanted ink caused by ink splattering, ribbon flaking, etc.;

39—Image curvature measurement: examine individual strokes of each character to determine the curvature of each stroke and the radii of stroke intersections and terminations where appropriate.

When all print characteristics have been examined and measured for each character, the measurements for an individual character are compared with a predefined set of measurements M(i) for the standard images, one such set existing for each character defined in the font being analyzed. Individual measurements within each set M(i,j) are a function of the character font and document format requirements.

The results of the comparisons for each character R(i) are accumulated for the document and a judgment is made as to the acceptability of the print. The criteria of the judgment are also functions of the character font and document format requirements.

For many of the print measurements, it will be possible and desirable to cross correlate the observed measurements for each character between the data sets derived from each sensor. For example, in the present embodiment, vertical stroke widths can be measured both optically and magnetically. When there is disparity between the two measurements, special criteria will be used to priorize the result, such criteria also being based on the character font and document format specifications. As another example, consider a print sample consisting of a magnetic ink font which contains non-magnetic extraneous ink splatters. The optical image will show the presence of the extraneous ink while the magnetic image will not. If the print specification allows non-magnetic extraneous ink, no fault will be issued.

The final result is then presented to an operator, for example, by means of computer video interface. The result may be condensed to a simple "Yes" or "No" or may be accompanied with a detailed description of print faults.

While FIGS. 1B and 1C are based on the multi-element sensor of FIG. 1A being a single slot magnetic transducer and a linear optical array sensor, the process of analysis is similar for other types of multi-element sensors as well. For example, there could be two multi-element sensors a linear magnetic array sensor and a linear optical array sensor.

One type of printed character measurement device described for this invention is based on a system using optical sensing. Other methods of shape detection and measurement, including magnetic, thermal and acoustic are equally feasible and will be readily apparent to those skilled in the art using the methods and devices described.

The optical measurement device consists of several functional blocks of equipment. These include:

(a) a source of illumination directed at the area of the document sensed by the scanner. The wavelength of this illumination is chosen so as to maximize the probability of reliably detecting the printed information;

(b) a lens capable of focussing the image of the area of the document to be scanned onto the active area of the sensor element;

(c) a sensor controller which produces all the control signals required to operate the sensor in an optimum synchronized manner, with respect to both the measurement system and the illumination requirements;

(d) a document transport and control system, which moves the document into the field of view of the sensor, if necessary moves it past the sensor at a controlled rate while the sensor scans the document and then removes it from the field of view when completed;

(e) an analog-to-digital converter which changes the analog, time-varying signal from the sensor into a series of equivalent numerical values, representing the instantaneous value of the reflected light level at appropriate measurement times. The brightness measurement resolution required by this device will be dependent upon the type of information to be detected. Information which is represented as a series of very gradual shares will require very fine brightness measurement intervals. Information which is represented as stark black/white steps will be detectable with very coarse brightness intervals. The output of this converter is equivalent to a digital representation of the source document brightness;

(f) a conversion controller, which generates control parameters for the A/D converter, causing it to operate in a manner which will ensure that all pertinent information on the document is properly digitized and available for subsequent analysis, with a minimum of extraneous, unwanted background information;

(g) a digital image format converter, which stores and reformats the image information from the A/D converter into a form suitable for retention in the digital image memory;

(h) a digital image memory capable of storing enough information to represent at least one full document image. This memory receives reflected brightness information from the scanning device using the scanner's time reference controller. It then produces the stored information for the analysis devices in their time scale, upon command. It is in effect both a time compressor and expander;

(i) a memory controller device, which operates the image memory under control of signals from both the scanning device and the image analysis devices. This controller ensures that information from the scanner is stored at the appropriate place in memory at the correct time and that the information is made available to the analysis devices as it is required by them. In addition, by signalling the document transport controller, it ensures that no document information will be lost, in effect controlling the flow of source documents through the scanning device;

(j) a device for detecting patterns of information in the image stored in memory, separating these patterns from the background image and passing the pattern information and pattern location information to an information converter;

(k) an information converter which accepts information patterns and locations from the pattern detector and converts them, if necessary, to a form more suitable for use by the recognition logic only. For example, the shape of a character may be altered from an exact image form to one in which the character is described as a set of predetermined features;

(l) an information recognizer, which identifies the converted information patterns presented to it, using sets of pre-stored parameters and recognition logic suited to the complexity of the patterns themselves. Patterns which cannot be recognized exactly are marked as unknown, and the recognizer may attempt a "best-guess" whenever the need is present;

(m) a comparator device, which compares the recognized patterns against stored ideal measurements, producing a quality judgment factor which is a measurement of the deviation of the original pattern detected on the document from the stored ideal pattern;

(n) a set of decision logic which accepts the quality factor result from the comparator, and dependent upon the invention of the measurement system, produces a measurement result ranging from "Yes/No" to a "percentage of acceptability";

(o) an optional computer, which provides a means of automatically operating the measurement system unattended, storing measurement results for statistical purposes and presenting these results to an operator in a meaningful form.

Figure 2:
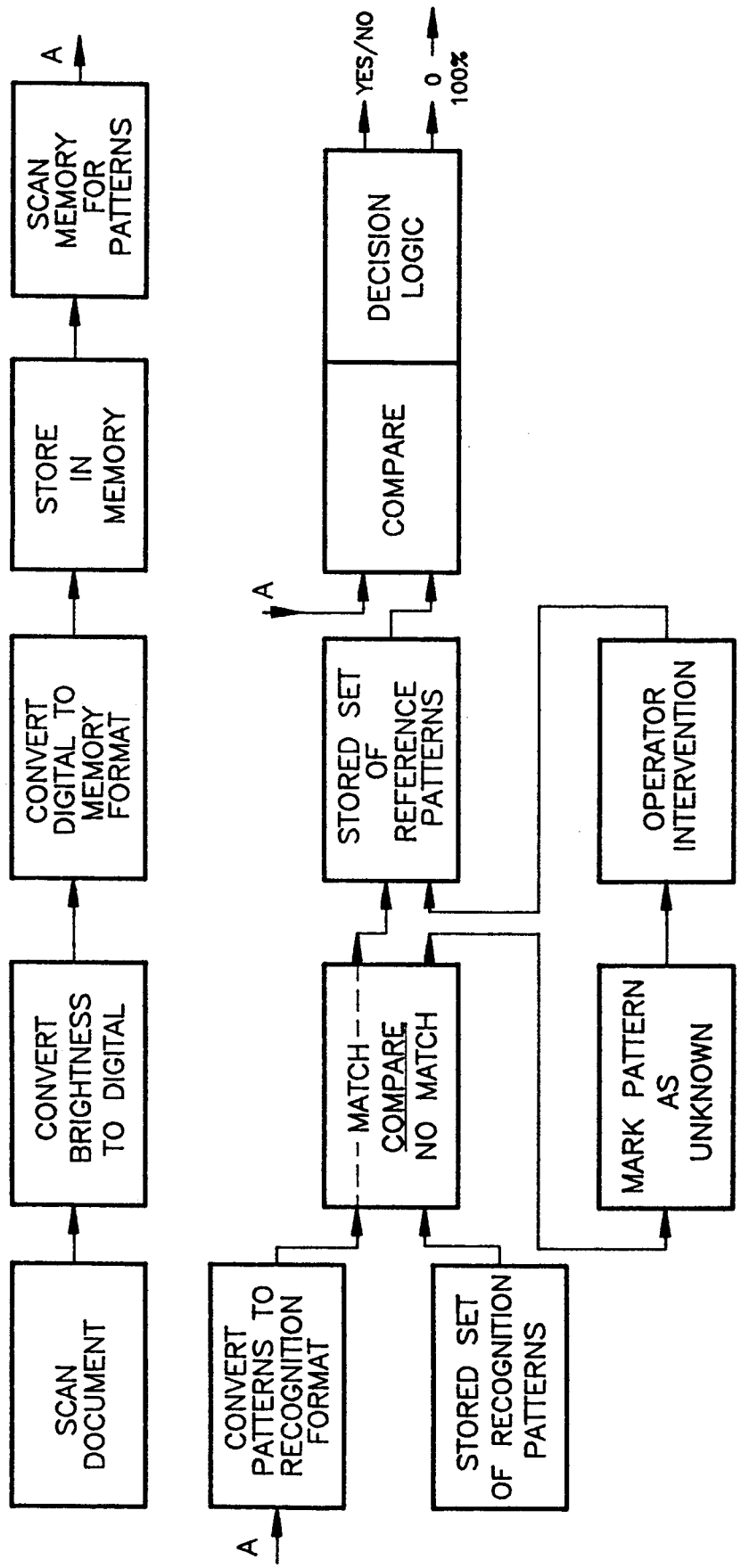
FIG. 2 is a block diagram of a further embodiment of the present invention.
Figure 3:
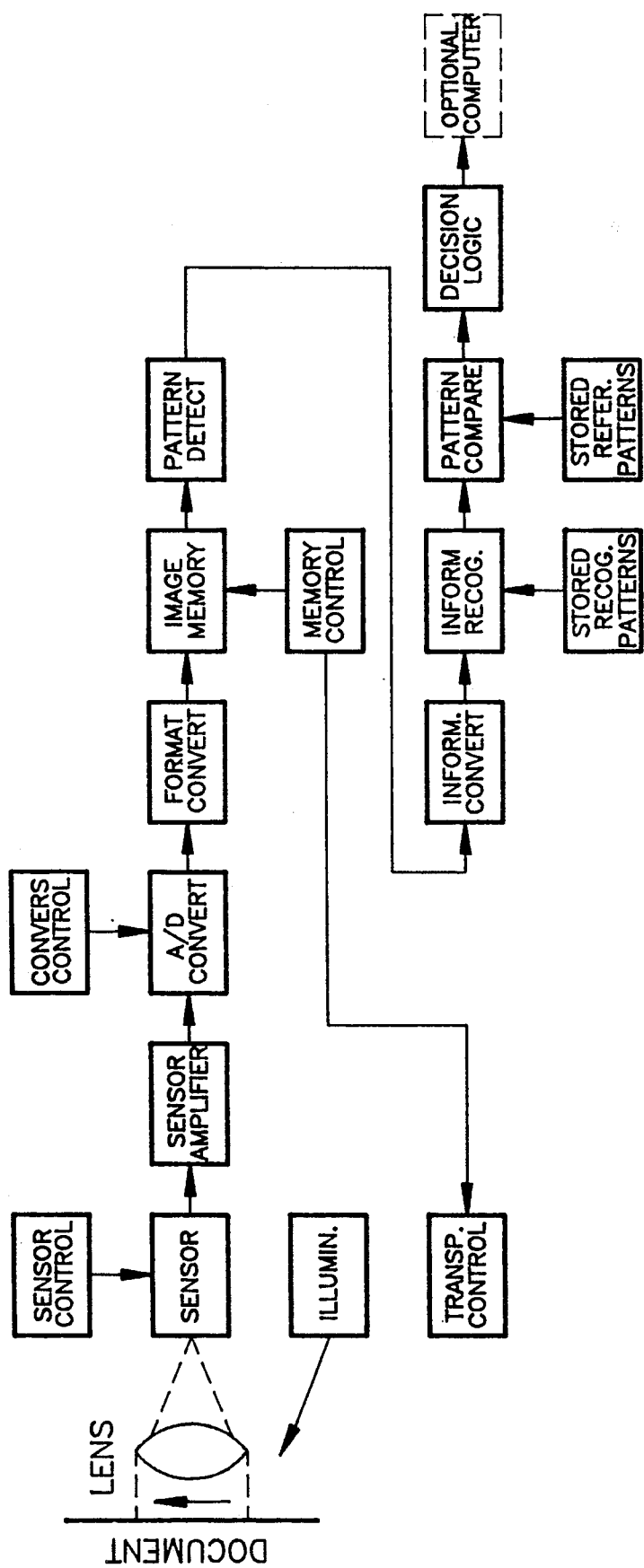
FIG. 3 is a block diagram of still a further embodiment of the present invention.

In FIGS. 2 and 3, there are shown two embodiments respectively of optical printed shape measurement devices. These embodiments are self-explanatory in view of the description already set out for the block components.

The present invention is a general purpose print quality analysis/measurement system which actually senses or detects the printed image through sensors having one or more transducers. The background material on which the image is printed can be either transported by the transducer or the transducer itself can be moved over the image to be sensed. Various types of background material for the printed images are suitable, for example, paper, plastic and textiles. Various types of print can be analyzed, for example, bar codes, logos and alpha numeric using a variety of printing inks, for example, magnetic, optical, flourescent and embossed. The image can also be sensed using a transducer which can scan the complete image with no mechanical movement of the image or transducer.

As previously stated, the transducer(s) can be of various types, including optical, magnetic and/or acoustic. A transducer may be used in the system alone if the transducer is an optical transducer or in combination with other transducers. The type of transducer to be used depends on the physical image attributes to be detected and analyzed. For example, the acoustic transducer may be used to sense and measure the raised print on an embossed plastic credit card. An optical transducer may be used to detect the print of the OCR and magnetic fonts. A magnetic transducer may be used to detect the magnetic image information in magnetically printed fonts such as E13B (a trade mark) and CMC-7 (a trade mark). A combination of optical and magnetic transducers for example could be used to detect the optical and magnetic print image and characteristics for automatic analysis by the print quality analysis and measurement system.

Single element transducers require that the printed image to be sensed and transducer be moved with respect to each other such that the whole image is scanned by the transducer. The transducer thus outputs an analog waveform which represents the original image. This analog waveform is typically amplified and filtered and have conditioned by these various and other signal processing means to minimize distortion and remove interference from the detected signal representing the image. After conversion from analog waveform to digital the waveform is then sent to the PIRL and/or PIAL (Printed Image Analysis Logic) to analyze the specific quality characteristics of the waveform with respect to the ideal specified waveform stored for that particular image. The waveform thus represents a transformed version of the original image with some information loss but which is a lower cost version of the multiple element transducer approach.

A linear or one-dimensional multiple element transducer produces a number of analog signals representing various points on the image when the transducer and image are moved with respect to each other. This process in effect produces a two-dimensional electronic "image" of the original printed image. The electronic "image" thus produced will have a certain spatial resolution depending upon the sampling density of the transducer. The multiple transducer element analog signal samples are then amplified via multiple amplifiers and the signals are conditioned by various multiples of filters and minimum signal level thresholders before being converted to digital signals by the A/D converters. The digital image representation is then analyzed and measured and compared to the image specification requirements stored in memory. The output from this process gives a measure of the quality and automated machine readability of the original printed image.

Two-dimensional array transducers also produce a two-dimensional electronic image of the original printed image except that once the image to be scanned is placed in front of the two-dimensional transducer array and the scanning action is initiated, either manually or automatically, no motion of the image to be scanned or the transducer is required since the two-dimensional transducer scans electronically.

This invention is primarily aimed at the analysis and measurement of a variety of types of printed images sensed by multiple element transducers to determine their quality and machine readability to a specific standard. The inputs from single element transducers are an aid to the multiple element transducers in this process. However, where the transducers are optical transducers, they can be single or multiple element transducers and they can be used along or together with other transducers, within the scope of the attached claims.

One of the more common implementations of the invention will involve a combination of at least two different types of transducers. The two most likely combinations are; 1) a single element magnetic transducer and a multiple element one-dimensional linear array optical transducer, or 2) a multiple element magnetic transducer and a multiple element one-dimensional optical linear array.

The most common single transducer implementations of the invention will be 1) multiple element magnetic 2) multiple element one-dimensional optical 3) multiple element two-dimensional optical 4) single element magnetic, when accompanied by another multiple element transducer 5) single element optical.

The image qualification system of the present invention can be implemented using a combination of hardware, firmware and software. Essentially, referring to FIG. 1A, all the functions 1 to 4, inclusive, could be implemented in hardware and the functions 5 to 8, inclusive, could be implemented in firmware in a programmable logic controller or in software in a personal computer. In the case where the quality analysis logic is implemented in software, the program algorithms and logic will be protected by copyright.

The system of the present invention has the ability to collect, accumulate, analyze and communicate the printed image quality statistics over a range of sample and/or time set by the system operator. A specific software module will perform this function in the personal computer.

Some specific applications of the present invention will be in the area of alpha-numeric and special symbols as used in the item processing industry. For example, the system can be used to process newly printed cheques to determine whether images printed on the cheques meet the required standards before the cheques are put into use. The qualification system of the present invention provides improved results whether multi-element sensors are used or a single element optical sensor is used.

What I claim as my invention is:

1. A system for automatically determining the quality of printed images on a background material by measuring specific characteristics of said images by comparing them to a set of measurements for standard images stored in an electronic memory, said system comprising:

(a) recognition means, transducing means and measuring means;
    (b) said recognition means first identifying a particular character for each of the printed images to be measured;
    (c) said transducing means having at least one multi-element sensor that is selected from the group of magnetic or optical, said multi-element sensor being arranged to scan the same printed images for which the character has been identified by said recognition means, said multi-element sensor producing a series of analog signals in the form of two-dimensional electronic images, there being one electronic image for each of said printed images;
    (d) said multi-element sensor being connected to amplifiers and filters and to an analog-digital converter to convert said analog signals to digital signals;
    (e) said measuring means electronically measuring certain image characteristics for said electronic images by comparing the measurements taken to a set of measurements for standard images; and
    (f) means for producing a result of said comparison and means for making a decision as to whether each of the printed images satisfy the set of measurements for standard images.

2. A system as claimed in claim 1 wherein the system has at least two sensors one sensor being a single element magnetic transducer and another sensor being a linear optical array sensor.

3. A system as claimed in claim 1 wherein the system has at least two multi-element sensors one sensor being a linear magnetic array sensor and another sensor being a linear optical array sensor.

4. A system as claimed in claim 1 wherein the system has at least two sensors one sensor being a single element magnetic transducer and the other sensor being a two-dimensional optical array.

5. A system as claimed in claim 1 wherein the at least one multi-element sensor is a multiple element magnetic transducer.

6. A system as claimed in claim 1 wherein the at least one multi-element sensor is a multiple element two-dimensional optical transducer.

7. A system as claimed in claim 1 wherein the at least one multi-element sensor is a multiple element one-dimensional optical transducer.

8. A system as claimed in claim 1 wherein the system has at least two multiple element sensors, one sensor being a two-dimensional optical sensor and another sensor being a multiple element magnetic transducer.

9. A system as claimed in claim 1 wherein the means for electronically measuring said electronic images by comparing the measurements taken to a set of measurements for standard images and the means for producing a result and means for making a decision of said comparison is a microprocessor controlled by software, firmware or logic.

10. A system as claimed in claim 9 wherein there is a printer connected to the microprocessor to print out the results of the comparison.

11. A system as claimed in claim 1 wherein there is a monitor connected to the microprocessor to display the results.

12. A system as claimed in claim 1 wherein there is a sensor controller for the multi-element sensor.

13. A system as claimed in claim 12 wherein the sensor has an optical transducer and there is a source of illumination and a lens for said optical transducer.

14. A system as claimed in claim 1 wherein there are means to transport the printed images relative to the sensor or sensors in order to scan said images.

15. A system as claimed in claim 1 wherein the sensor or sensors have a multi-slot transducer that scans the printed images without relative movement of the images past the transducer.

16. A system as claimed in claim 1 wherein there are means for automatically calibrating the system.

17. A system as claimed in claim 1 wherein the system contains a diagnostic subsystem to provide an automatic check on the system.

18. A system as claimed in claim 1 wherein the means for electronically measuring the electronic images by comparing the measurements taken to a set of measurements for standard images is a two-step process involving firstly a determination based on whether the printed images can be recognized and secondly a measurement of said printed images, at least one of said measurements being taken being selected from the group of image location and spacing measurement, image print contrast/intensity measurement, image skew angle measurement, image stroke width measurement, image edge variation measurement, image void measurement, image size and dimension measurement, image extraneous ink measurement and image curvature measurement.

19. A system as claimed in claim 18 wherein the means for electronically comparing said images is a microprocessor.

20. A system as claimed in claim 19 wherein the microprocessor can produce results for a series of samples simultaneously.

21. A system for automatically determining the quality of printed images on a background material by measuring specific characteristics of said images by comparing them to a set of measurements for standard images stored in an electronic memory, said system comprising recognition means and transducing means, said recognition means first identifying a particular character for each of the printed images to be measured, said transducing means having at least one sensor with an optical element, said sensor being arranged to scan the printed images for which the character has been identified by said recognition means, said sensor producing a series of analog signals in the form of two-dimensional electronic images, there being one electronic image for each of said printed images, said sensor being connected to amplifiers and filters and to an analog-digital converter to convert said analog signals to digital signals, means for electronically measuring said electronic images by comparing the measurements taken to a set of measurements for standard images, means for producing a result of said comparison and means for making a decision as to whether each of the print images satisfy the set of measurements for standard images.

22. A system as claimed in claim 21 wherein the sensor has an optical transducer and there is a source of illumination and a lens for said optical transducer.

23. A system as claimed in claim 22 wherein the sensor is a multi-element sensor and produces a series of analog signals in the form of a two-dimensional electronic image for said printed images, at least one of the measurements being taken being selected from the group of image location and spacing measurement, image print contrast/intensity measurement, image skew angle measurement, image stroke width measurement, image edge variation measurement, image void measurement, image size and dimension measurement, image extraneous ink measurement and image curvature measurement.

* * * * *